(12) United States Patent
Komolrochanaporn

(10) Patent No.: US 7,644,955 B1
(45) Date of Patent: Jan. 12, 2010

(54) QUICK COUPLING TYPE FITTING

(76) Inventor: Naris Komolrochanaporn, 185/3 Rachdamri Rd., Bangkok (TH) 10330

( * ) Notice: Subject to any disclaimer, the term of this patent is extended or adjusted under 35 U.S.C. 154(b) by 0 days.

(21) Appl. No.: 12/217,455

(22) Filed: Jul. 3, 2008

(51) Int. Cl.
*F16L 55/00* (2006.01)

(52) U.S. Cl. .......................... 285/23; 285/307; 285/340

(58) Field of Classification Search ............... 285/39, 285/23, 104, 105, 340, 307
See application file for complete search history.

(56) References Cited

U.S. PATENT DOCUMENTS

| | | | |
|---|---|---|---|
| 1,864,339 A | | 6/1932 | Church |
| 3,004,781 A | | 10/1961 | Morris |
| 3,743,326 A | * | 7/1973 | Courtot et al. ............. 285/105 |
| 4,021,062 A | * | 5/1977 | Mariaulle .................... 285/39 |
| 4,067,534 A | | 1/1978 | Frey |
| 4,178,023 A | * | 12/1979 | Guest ......................... 285/323 |
| 4,305,606 A | * | 12/1981 | Legris ......................... 285/39 |
| 4,431,216 A | * | 2/1984 | Legris ......................... 285/104 |
| 4,561,678 A | | 12/1985 | Kunsman |
| 4,637,636 A | * | 1/1987 | Guest ......................... 285/38 |
| 4,722,558 A | * | 2/1988 | Badoureaux ................ 285/39 |
| 4,940,260 A | | 7/1990 | Odriozola |
| 5,160,175 A | | 11/1992 | Yang |
| 5,226,682 A | | 7/1993 | Marrison et al. |
| 5,286,066 A | | 2/1994 | Yang |
| 5,370,423 A | * | 12/1994 | Guest ......................... 285/39 |
| 5,387,017 A | | 2/1995 | Gill |
| 5,419,594 A | | 5/1995 | Nelms |
| 5,692,785 A | | 12/1997 | Wartluft et al. |
| 5,779,284 A | * | 7/1998 | Guest ......................... 285/322 |
| 6,062,537 A | | 5/2000 | Chih |
| 6,183,022 B1 | * | 2/2001 | Guest ......................... 285/322 |
| 6,398,267 B1 | | 6/2002 | Detable et al. |
| 6,824,172 B1 | * | 11/2004 | Komolrochanaporn ...... 285/340 |
| 6,905,151 B2 | | 6/2005 | Froment et al. |
| 6,921,115 B2 | | 7/2005 | Gill |
| 6,964,436 B2 | * | 11/2005 | Le Quere .................... 285/319 |
| 7,025,393 B2 | | 4/2006 | Amedure et al. |
| 2003/0001383 A1 | * | 1/2003 | Halama ....................... 285/39 |
| 2003/0006609 A1 | * | 1/2003 | Yates ......................... 285/39 |
| 2004/0094739 A1 | | 5/2004 | Lacroix et al. |
| 2004/0245766 A1 | * | 12/2004 | Vallee ......................... 285/39 |
| 2006/0108802 A1 | | 5/2006 | Baumgartner |

* cited by examiner

*Primary Examiner*—Aaron M Dunwoody
(74) *Attorney, Agent, or Firm*—Sandy Lipkin

(57) ABSTRACT

A quick coupling type fitting is disclosed that connects two ends of two different pipes together in a fluid tight manner. It is designed for convenience in installation, high strength, compact size, easy manufacture with a low production cost, high efficiency and does not require the use of special tools for installation. The coupling utilizes a grab ring module that has a grab ring made with embedded stainless steel, thereby strengthening the fixing force and allowing for quick installation. A flaring surface on a retaining flange has an angle that corresponds to a tapering surface of the grab ring module. When the flaring surface and the tapering surface contact each other, the grab ring module compresses the surface of the pipe. Because the grab ring module has an outer plastic body with a small inner part, the grab ring module can be compressed to the pipe without causing fatigue of any members inside of the fitting. A specialized tool allows for quick and easy dismantling of the fitting.

4 Claims, 4 Drawing Sheets

QUICK COUPLING TYPE FITTING

BACKGROUND OF THE INVENTION

1. Field of the Invention

The present invention relates generally to the field of pipe fittings, and more particularly to a fitting for coupling two sections of pipe that are connected together in a fluid tight manner that does not require welding, adhesive, the use of special tools, or other conventional techniques of permanently securing pipes.

2. Background and Description of the Prior Art

Plastic pipe has long been used for conveying fluids such as liquids and gases. Pipe fittings are utilized to connect sections of aligned pipe together. These pipe fittings must provide a fluid tight connection without any leakage over a range of operating temperatures, pressures and a variety of other surrounding conditions. For plastic pipe, however, a reliable fitting is rarely achieved owing to the stress of the fitting caused by the continuous operation of the plastic pipe or the changing of ambient conditions such as temperature and pressure. Such conditions of operation cause the fatigue of the fittings, thereby resulting in performance degradation and leakage.

Many types of pipe fittings are currently commercially available. One type is a compression fitting system. This type of fitting is rather large when compared to the pipe, and requires tools for installation. Due to the bulky size of this type of fitting, its use requires an extensive working space to provide for the installation of such fittings. When use is required in a limited space, e.g., in concrete walls, this type of fitting is very inconvenient.

Moreover, the pipe fittings of the prior art have the potential to be easily dismantled from the pipeline, which may lead to plundering of fluid within the pipeline. The pipe fitting of the present invention, however, requires some special tools to remove the pipe from the fitting thereby eliminating the possibility of any damage to the fitting or the pipe due to inadvertent dismantling while in use.

In the manufacture of the plastic pipe fitting of the prior art as discussed herein, the pipe is first inserted into the fittings and then pulled back so that the teeth of the fitting bite deeply into the wall of the pipe thereby securing the pipe to the fitting in a fluid tight manner. In general, the teeth are constructed from engineering plastics that have limited strength and that are incapable of gripping a pipe that has rather hard surface such as PVC pipe or metallic pipe. Moreover, the firmness of the grip on the pipe decreases with the rise in the temperature of the fluids conveyed through the pipe. If the teeth are totally metallic, they have to be constructed to have a very thick formation due to the portions that form corners. This causes inconvenience in the radial compression because a lot of force is required in order to compress the grip ring to confine it to the surface of the pipe. Such an operation can cause fatigue and deformation of the plastic member exerting the compressive force.

It is the primary objection of the present invention therefore to provide a plastic pipe fitting that can be used for joining two sections of pipe that are aligned in the same straight line or in the vertical direction in a fluid tight manner over a range of operating pressures and temperatures.

It is yet another objective of the present invention to provide a pipe fitting that can be easily installed without requiring any tools or specially-skilled workers.

It is yet another objective of the present invention to provide a pipe fitting that is compact in size and easy to install in narrow or restricted areas such as embedding in walls or in limited spaces, thus facilitating the installation of the pipe system.

It is yet another objective of the present invention to provide a pipe fitting that can be manufactured on an industrial scale with a production cost lower than most of the prior art, thereby allowing the fittings to be sold to the ultimate consumer at a relatively inexpensive price.

SUMMARY OF THE INVENTION

The instant invention discloses a quick coupling type pipe fitting system comprising a pipe fitting body further comprising an inner wall; a through hole for placement of a pipe therethrough; a pipe stopper located inside of the through hole; an o-ring chamber; a supporting flange; and an integral retaining flange having an upper internal surface that has a cylindrical shape and a lower surface that flares out into a conical shape with a flaring surface; a seal o-ring for placement inside of the o-ring chamber; a grab ring module further comprising a grab ring embedded in the grab ring module with a plurality of teeth that form a circle having a radius slightly smaller than the radius of the exterior surface of the pipe that is placed inside of the pipe fitting; a split line to facilitate compressive movement of the grab ring module; a sloping surface that corresponds to the flaring surface of the pipe fitting body; and a first shoulder and a second shoulder that prevent the grab ring module from losing position relative to the pipe fitting body when internal pressure from the pipe is very high; a protection cap that attaches to the retaining flange; and a dismantling key having a wedge shape that is inserted into the split line in order to expand the split line forcing the teeth outward from the surface of the pipe.

The above embodiment can be further modified by defining that the grab ring is made of engineering plastic.

The above embodiment can be further modified by defining that the grab ring is made of stainless steel.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
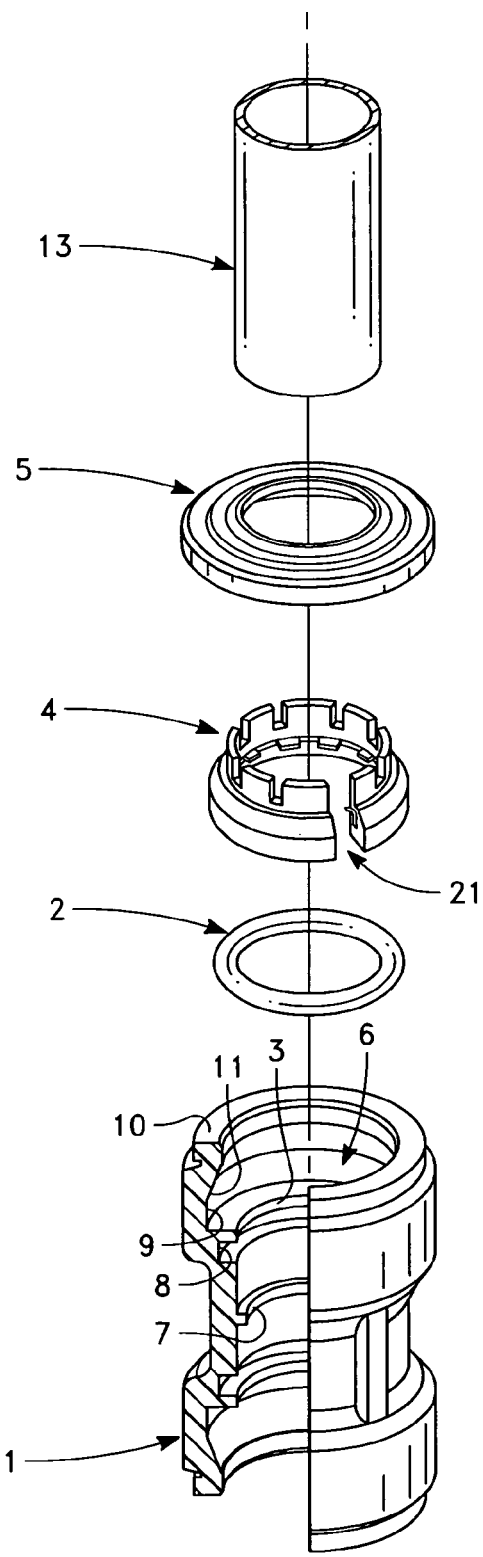
FIG. 1 is an exploded view of the pipe of the instant invention.
Figure 2A:
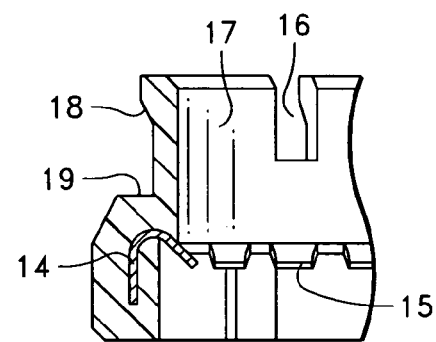
FIG. 2 offers close-up, side cross-sectional views of the grab module and the pipe fitting body.
Figure 2B:
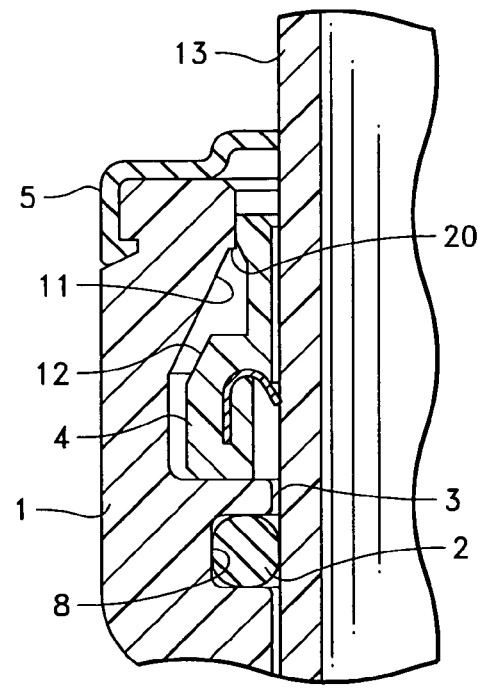
Figure 3:
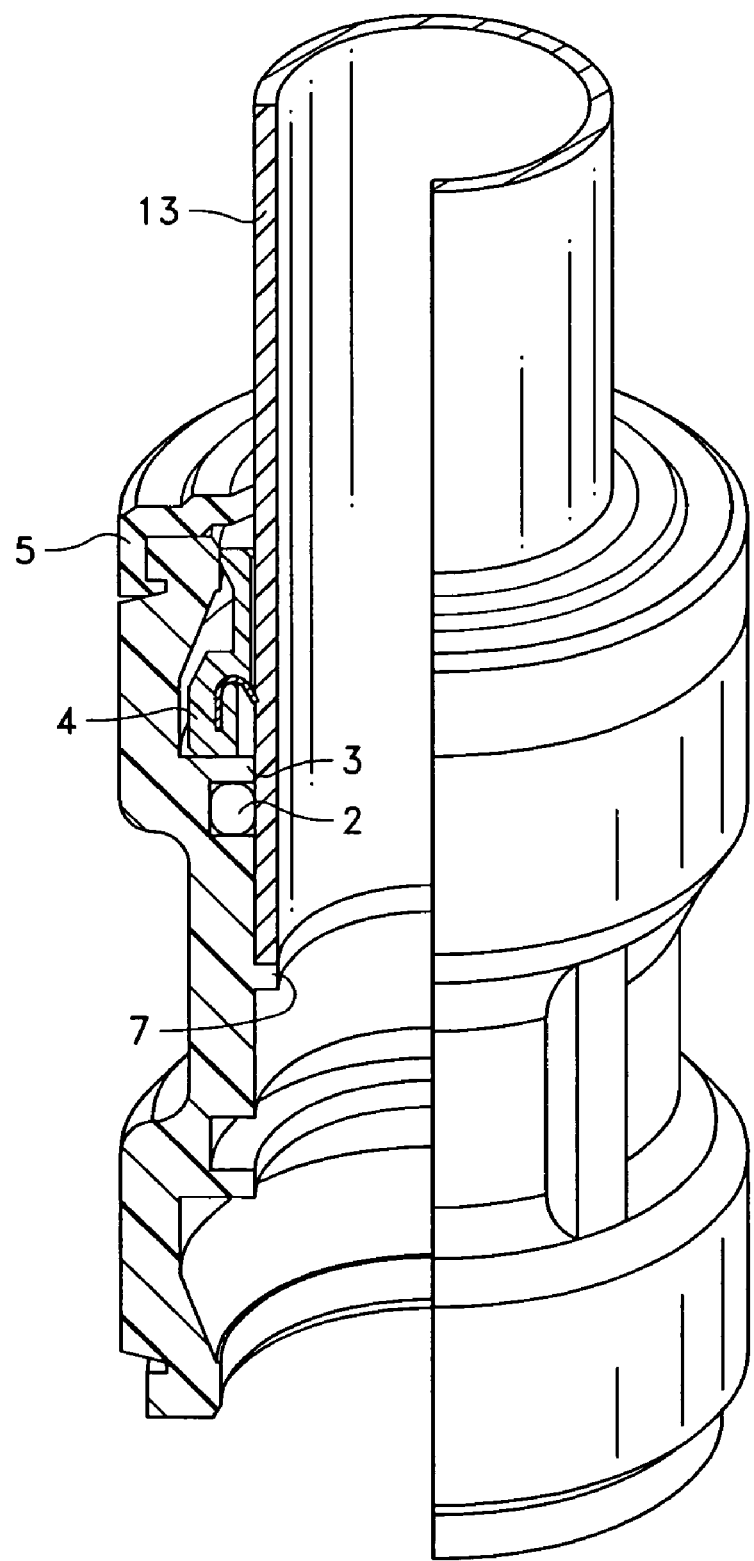
FIG. 3 is a cross-sectional view of the pipe fitting showed in FIG. 1 showing the location of each part showed while in use.
Figure 4:
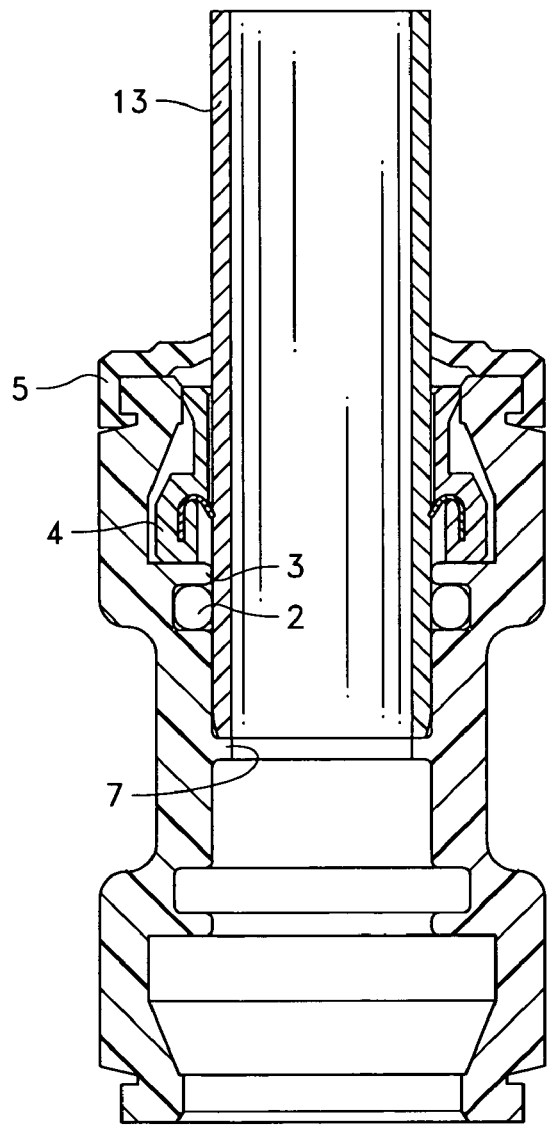
FIG. 4 is a longitudinal cross sectional view of the fitting as shown in FIG. 3 demonstrating the position of the interior components of the pipe fitting at the moment in which a pipe is fully inserted into the fitting.
Figure 5:
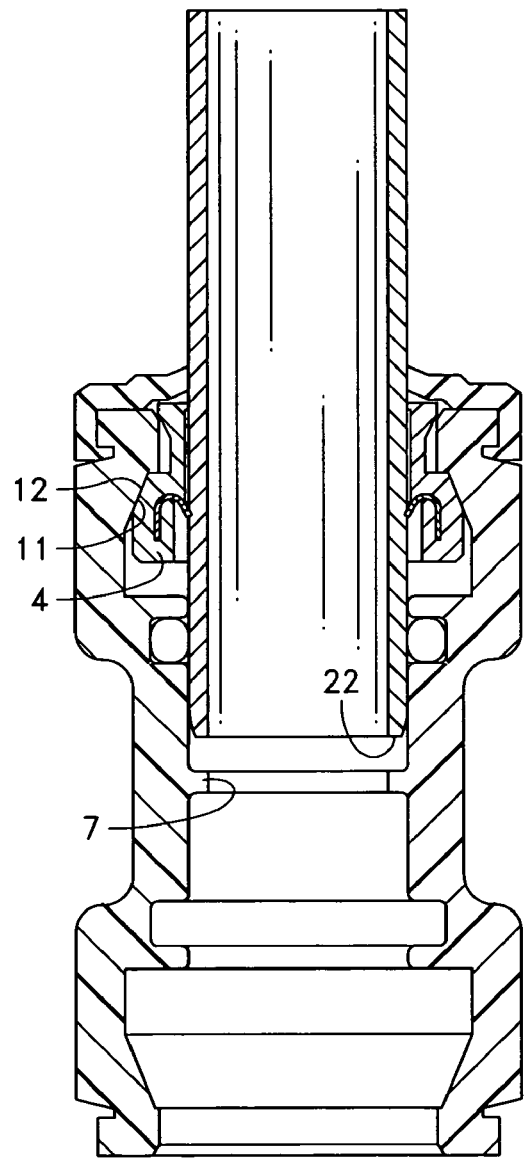
FIG. 5 is another longitudinal cross sectional view of the fitting as shown in FIG. 3 demonstrating the position of the interior components of the pipe fitting at the moment in which the pipe is pulled slightly backward.
Figures 6, 8:
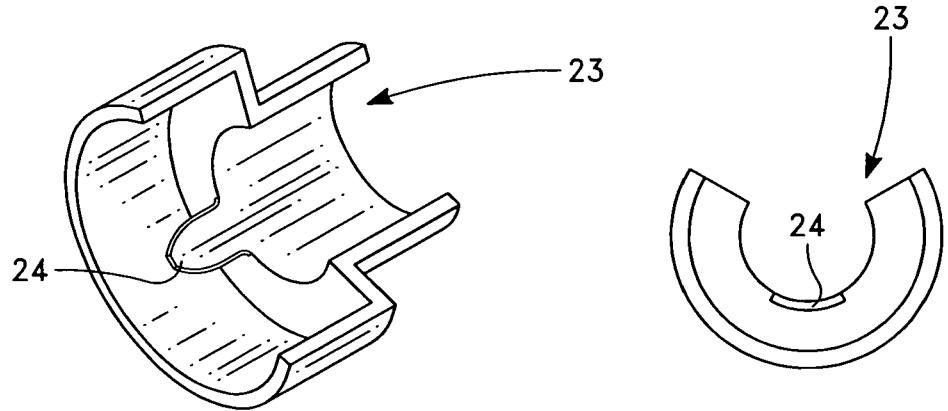
FIG. 6 is a perspective view of the dismantling device specially designed for dismantling the fittings according to the preferred embodiments of the instant invention.
FIG. 8 is an end view of the dismantling device shown in FIG. 6.
Figure 7:
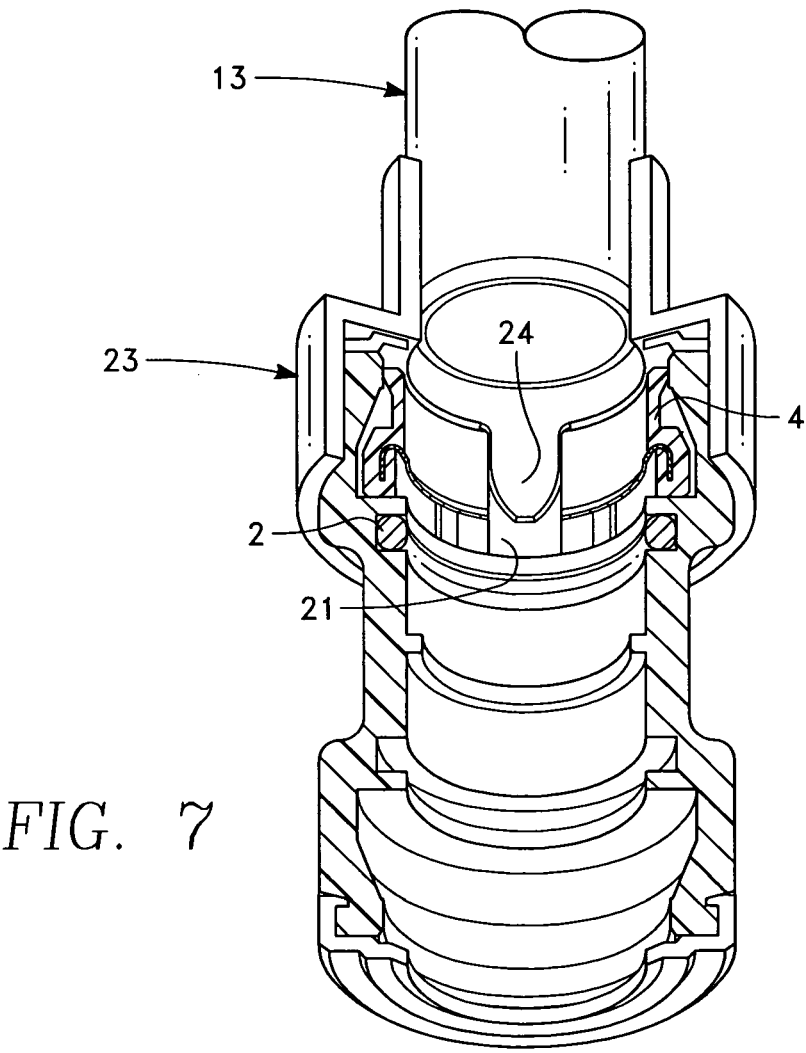
FIG. 7 is a cross sectional view of the pipe fitting when the pipe is dismantled by the dismantling device shown in FIG. 6.

Turning to the drawings, the preferred embodiment is illustrated and described by reference characters that denote similar elements throughout the several views of the instant invention.

The preferred embodiment refers to an improved pipe fitting that is shown in exploded view in FIG. 1. The fundamental parts of the pipe fitting are composed of the pipe fitting body 1, a seal o-ring 2, a supporting flange 3, a grab ring module 4, and a protection cap 5.

The pipe fitting body 1 has a through hole 6. In the through hole 6 there is a pipe stopper 7, an o-ring chamber 8, and an inner wall 9.

The retaining flange 10 of the pipe fitting, which is integrated into the fitting body 1, has its upper internal surface that has a cylindrical shape. Its lower surface flares out into a conical shape with a flaring surface 11 having a slope corresponding to the sloping surface 12 of the grab ring module 4.

The protection cap 5 is overarched firmly on the retaining flange 10 to prevent the small particles found on construction sites, such as sand, stone, or cement flake, from falling into the grab ring module 4. Those small particles can accumulate or obstruct in the cut 16 and the split line 21 causing the grab ring module 4, at best, to work improperly or, at worst, not to work at all.

The seal o-ring 2 resides in the o-ring chamber 8. The supporting flange 3 limits the movement of the seal o-ring 2 to the pre-determined position and prevents the grab ring module 4 from pressing on the seal o-ring 2. Therefore, no extensive force is needed to push the pipe 13 into the pipe fitting body 1.

The grab ring module 4 comprises a grab ring 14 made from a thin stainless steel ring that has a set of teeth 15 that point to the center of the grab ring 14. The tips of the teeth 15 form a circle. This circle has a radius that is slightly smaller than the radius of the exterior surface of the pipe 13. The grab ring 14 is embedded into the grab ring module 4, which is made from an engineering plastic. There is a split line 21 which facilitates the compressive movement of the grab ring module 4. The upper cylindrical part of the grab ring module 4 has several cuts 16 which divide the upper cylindrical part into several walls 17. At the top of some selected walls 17, the small angular part 18 protrudes out to help the central axis of the grab ring module 4 align with the central axis of the pipe 13 and the pipe fitting body 1. This makes the grab ring module 4 firmly affix to the outer surface of the pipe 13, thus, allowing the pipe fitting to withstand higher internal pressure from the pipe.

Dismantling the pipe 13 from the pipe fitting body 1 can be done by using a specially designed key 23. The key 23 has a wedge shape 24 and it can be inserted to expand the split line 21 of the grab ring module 4. The expansion of the split line 21 will force the teeth 15 to move outward from the surface of the pipe 13. The shoulder 19 of the grab ring module 4 prevents the grab ring module 4 from losing position from the pipe fitting body 1 when the internal pressure from the pipe is very high.

The working principle of the pipe fitting body 1 is exhibited in FIGS. 1-7.

When an end 22 of the pipe 13 is inserted into the pipe fitting body 1 by passing through the retaining flange 10, the grab ring module 4, the supporting flange 3, and the seal o-ring 2, the seal o-ring 2 will be compressed between the outer surface of the pipe 13 and the inner wall 9 to prevent any leakage of the liquid between both surfaces. While the end 22 of the pipe 13 is pushed through the grab ring module 4, the grab ring module 4 will contact the surface of the pipe at all times via the contact of the teeth 15. The contact of the teeth 15 with the pipe 13 causes the grab ring module 4 slightly expands in the radial direction and moves along the pipe 13 until reaching the supporting flange 3.

After pushing the pipe 13 through the pipe fitting 1 until the end of the pipe 22 abuts the pipe stopper 7, the pipe 13 is pulled backward. The pulling backward of the pipe causes the grab ring module 4 to move with the pipe 13. The movement of the grab ring module 4 causes the sloping surface 12 of the grab ring module 4 to move to contact with the flaring surface 11 of the retaining flange 10. The contact area between the sloping surface 12 and the flaring surface 11 will increase according to the movement of the pipe 13. This movement compresses the grab ring module 4 onto the outer surface of the pipe 13 and makes the teeth bite deeply into the surface of the pipe 13, thus preventing the pipe 13 from becoming loosened from the pipe fitting 1.

In order to prevent the grab ring module 4 from slipping from the pipe fitting 1 when the internal pressure from the pipe 13 is very high, the retaining flange 10 is provided with a shoulder 20 that abuts against the shoulder 19 of the grab ring module 4 to stop the movement of the grab ring module 4. When the pressure from the pipe is normal, the shoulders 19, 20 will not contact each other. The working pattern of each part of the pipe fitting body 1 makes the pipe fitting 1 able to couple two sections of pipe efficiently.

The pipe fitting of the instant invention not only can couple two sections of pipe quickly with high efficiency, but can also easily remove the pipe fitting 1 from the pipe 13 by using a specially designed key 23. By inserting the wedge 24 of the key 23 into the split line 21 of the grab ring module 4, the wedge 24 will push apart the split line 21. This action causes the grab ring module 4 to expand radially outward. The expansion of the grab ring module 4 extracts the teeth 15 from the surface of the pipe 13. Hence, the pipe 13 can be easily pulled out from the pipe fitting 1.

The pipe fittings according to any preferred embodiments of the present invention has a special character, i.e., a specially designed tool that is required to disconnect the pipe fitting from the pipe. Conventional pipe fittings used in coupling two pipe sections not only can be installed easily, but also can be dismantled easily by hand or any conventional tools. This may lead to plundering of the fluid within the pipeline. The pipe fittings of the present invention are designed to require a specific tool designed for the dismantling of the pipe 13. The specific tool used for the dismantling of the pipe is hereby named "release key" 23.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A pipe fitting system comprising:
    a pipe;
    a pipe fitting body further comprising
        an inner wall;
        a through hole for placement of a pipe therethrough;
        a pipe stopper located inside of said through hole;
        an o-ring chamber;
        a supporting flange; and
        an integral retaining flange having an upper internal surface that has a cylindrical shape and a lower surface that flares out into a conical shape with a flaring surface;
    a seal o-ring for placement inside of said o-ring chamber;
    a grab ring module having a certain length, further comprising
        a grab ring embedded in said grab ring module with a plurality of teeth that form a circle having a radius slightly smaller than the radius of the exterior surface of said pipe that is placed inside of said pipe fitting;
        a split line that goes all the way through the length of said grab ring module to facilitate compressive movement of said grab ring module;
        a sloping surface that corresponds to said flaring surface of said pipe fitting body; and
        a first shoulder and a second shoulder that prevent said grab ring module from losing position relative to said pipe fitting body when internal pressure from said pipe is very high;
    a protection cap that attaches to said retaining flange; and
    a dismantling key having a wedge shape that is inserted into said split line in order to expand said split line forcing said teeth outward from the surface of said pipe.

2. The fitting system as defined in claim 1 wherein said grab ring is made of engineering plastic.

3. The fitting system as defined in claim 1 wherein said grab ring is made of stainless steel.

4. The fitting system as defined in claim 1 wherein said grab ring module includes an upper cylindrical part that further comprises a plurality of cuts that divide said upper cylindrical part into a plurality of subparts wherein at the top of some of said plurality of subparts, a small angular member protrudes therefrom.

* * * * *